US009260856B2

(12) United States Patent
Donoho

(10) Patent No.: US 9,260,856 B2
(45) Date of Patent: *Feb. 16, 2016

(54) BRANCHED SPIKE BIRD DETERRENT

(71) Applicant: Bird-B-Gone, Inc., Mission Viejo, CA (US)

(72) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,393

(22) Filed: Jul. 1, 2013

(65) Prior Publication Data
US 2013/0291451 A1 Nov. 7, 2013

Related U.S. Application Data

(60) Continuation of application No. 13/610,086, filed on Sep. 11, 2012, now Pat. No. 8,479,457, which is a continuation of application No. 12/485,274, filed on Jun. 16, 2009, now Pat. No. 8,276,324, which is a division of application No. 11/695,754, filed on Apr. 3, 2007, now abandoned, which is a continuation of application No. 10/508,804, filed as application No. PCT/US02/10117 on Apr. 1, 2002, now Pat. No. 7,243,465.

(51) Int. Cl.
*E04H 9/16* (2006.01)
*A01M 29/00* (2011.01)
*E04B 1/72* (2006.01)
*A01M 29/32* (2011.01)

(52) U.S. Cl.
CPC .................. *E04B 1/72* (2013.01); *A01M 29/32* (2013.01); *Y10S 119/903* (2013.01)

(58) Field of Classification Search
CPC ..... A01M 29/30; A01M 29/32; A01M 21/24; E04B 1/72; E04H 17/003; E04D 13/004; A01K 39/0113
USPC .............. 52/98, 101; 43/1; 256/11; 119/52.3, 119/57.9, 713, 903
See application file for complete search history.

(56) References Cited

U.S. PATENT DOCUMENTS

| | | |
|---|---|---|
| 2,225,992 A | 12/1940 | Hoess |
| 2,258,803 A | 10/1941 | Peles |
| 2,306,080 A | 12/1941 | Peles |
| 2,456,731 A | 12/1948 | Peles |
| 2,458,727 A | 1/1949 | Peles |
| 2,475,047 A | 7/1949 | Peles |
| 2,777,171 A | 1/1957 | Burnside et al. |
| 2,888,716 A | 6/1959 | Kaufmann |
| 2,938,243 A | 5/1960 | Peles |

(Continued)

FOREIGN PATENT DOCUMENTS

| | | |
|---|---|---|
| DE | 3501333 | 7/1986 |
| EP | 0300936 | 7/1987 |

(Continued)

*Primary Examiner* — Christine T Cajilig
(74) *Attorney, Agent, or Firm* — Fish & Tsang LLP

(57) ABSTRACT

A bird deterrent has a base and at least one branched spike extending from the base. The branching can occur anywhere along the spike, and a single branch point can give rise to multiple branches. Spikes can have multiple branches. The various branches can be of any suitable length(s), and can be oriented in any suitable direction(s).

15 Claims, 3 Drawing Sheets

(56) References Cited

U.S. PATENT DOCUMENTS

| | | | |
|---|---|---|---|
| 3,191,239 A | 6/1965 | Moore et al. |
| 3,282,000 A | 11/1966 | Shaw et al. |
| 3,323,266 A | 6/1967 | Dalkas |
| 3,407,550 A | 10/1968 | Shaw |
| 4,190,988 A | 3/1980 | Carreiro |
| 4,627,207 A | 12/1986 | Young et al. |
| 4,885,882 A | 12/1989 | Forshee |
| 5,253,444 A | 10/1993 | Donoho et al. |
| 5,433,029 A | 7/1995 | Donoho et al. |
| 5,528,858 A | 6/1996 | Omdahl |
| 5,648,641 A | 7/1997 | Guthrie |
| 5,691,032 A | 11/1997 | Trueblood et al. |
| D404,107 S | 1/1999 | Dimston |
| 6,250,023 B1 | 6/2001 | Donoho |
| 6,266,929 B1 | 7/2001 | Cline |
| 6,457,283 B1 | 10/2002 | Jensen |
| 6,546,676 B2 | 4/2003 | Wiesener et al. |
| 6,718,701 B2 | 4/2004 | Riddell |
| 6,775,950 B2 | 8/2004 | Donoho |
| 6,991,400 B1 | 1/2006 | Negueloua |
| 6,996,938 B1 | 2/2006 | Mullane |
| 7,040,058 B2 | 5/2006 | Finkelstein |
| 7,243,465 B2 | 7/2007 | Donoho |
| 7,596,910 B1 | 10/2009 | Donoho |
| 2001/0017012 A1 | 8/2001 | Wiesener et al. |

FOREIGN PATENT DOCUMENTS

| | | |
|---|---|---|
| EP | 0895716 | 2/1999 |
| FR | 2641304 | 1/1989 |
| FR | 2680447 | 8/1992 |
| FR | 2693080 | 1/1994 |
| GB | 2344269 | 8/2003 |
| JP | 61-239832 | 10/1986 |
| WO | WO 9508915 A1 * | 4/1995 |

* cited by examiner

US 9,260,856 B2

BRANCHED SPIKE BIRD DETERRENT

PRIORITY

This application is a continuation of U.S. patent application Ser. No. 13/610,086, filed Sep. 11, 2012, which is a continuation of U.S. patent application Ser. No. 12/485,274, filed Jun. 16, 2009, which issued as U.S. Pat. No. 8,276,324 on Oct. 2, 2012, which is a divisional of U.S. patent application Ser. No. 11/695,754, filed Apr. 3, 2007, which is a continuation of U.S. patent application Ser. No. 10/508,804 filed Sep. 23, 2004, which issued as U.S. Pat. No. 7,243,465 on Jul. 17, 2007, which is a U.S. National Stage Entry of PCT/US02/10117, filed Apr. 1, 2002. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is bird deterrents.

BACKGROUND OF THE INVENTION

Birds like to perch in various places including rooftops, ledges, and other areas on commercial buildings and residences. Unfortunately, when birds perch, they tend to be noisy and make an unsightly mess.

Birds can be deterred from landing through the use of mechanical bird deterrents. Especially useful such devices have a plurality of spikes that extend in different directions from a base support, as seen in FIG. 1. Numerous variations have been introduced over the years, including variations in the type of material (plastic, wire, etc) used for the spikes, the way the spikes are attached to the base, and the way the spikes are fanned out from the base. These and other variations are described in pending U.S. application entitled "Bird Deterrent With Parallel Spike Channels", filed on or about Mar. 12, 2002 (serial number to be determined), which is incorporated herein by reference in its entirety.

There is a tradeoff, however, with respect to the spacing of the spikes. If the spikes are too far apart, they allow smaller birds to maneuver between the spikes, and land on the surface supposedly being protected. If the spikes are too close together, the device may be too expensive to manufacture. Thus, there is a need for an improved bird deterrent that adequately circumvents these problems, while remaining simple and low cost.

SUMMARY OF THE INVENTION

The present invention involves bird deterrents having one or more branched spikes. The concept is quite broad, and there are innumerable variations on the theme. Among other things, embodiments are contemplated that have singly and/or multiply branched spikes, spikes having vertical, horizontal, or other orientations, and spikes comprising plastic, metal, or any other suitable material(s). Preferred embodiments have desirable manufacturing features such as ribbed spikes, and parallel orientation of the channels that receive the spikes. Preferred embodiments also have desirable usage features such as break points and glue channels in the base.

Various objects, features, aspects, and advantages of the present invention will become more apparent from the following detailed description of preferred embodiments of the invention.

DETAILED DESCRIPTION

Figure 1:
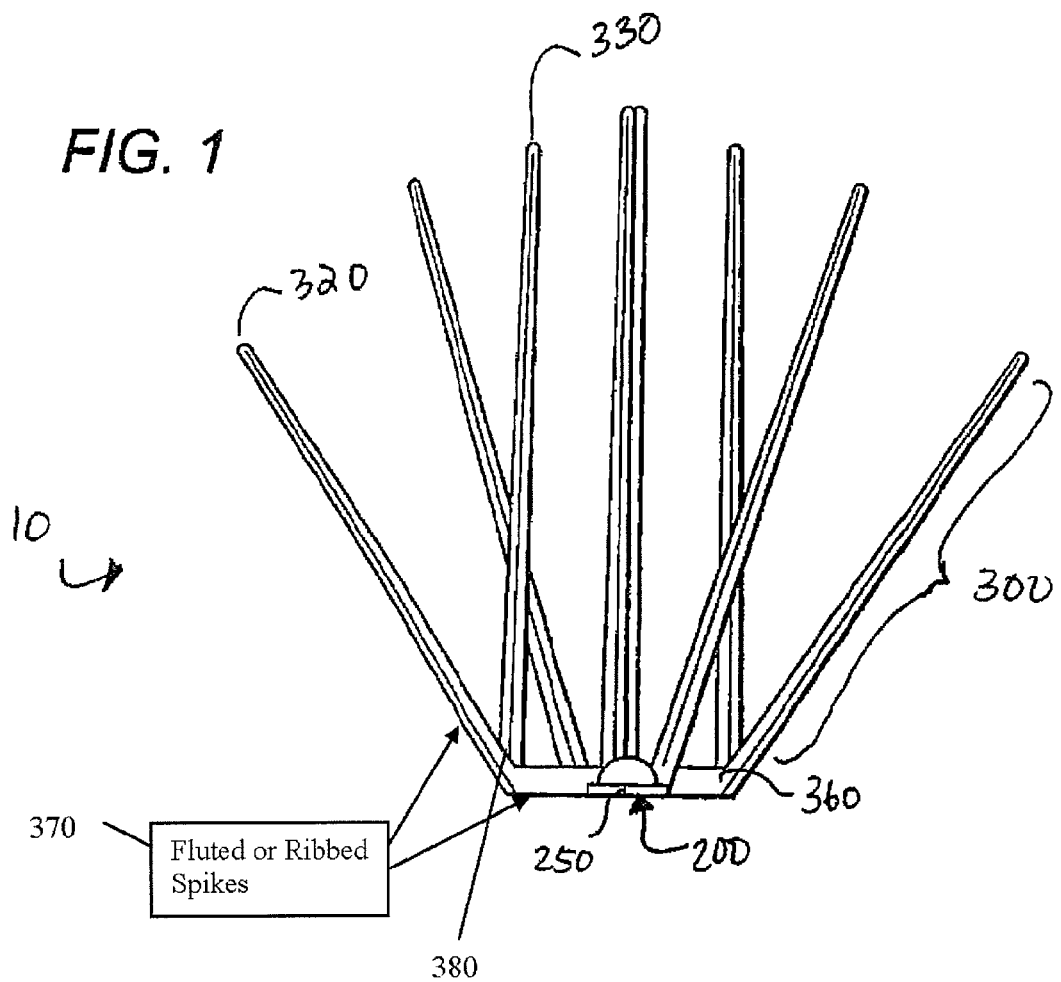
FIGS. 1 and 2 are perspective side views of a bird deterrent according to the inventive subject matter.
Figure 2:
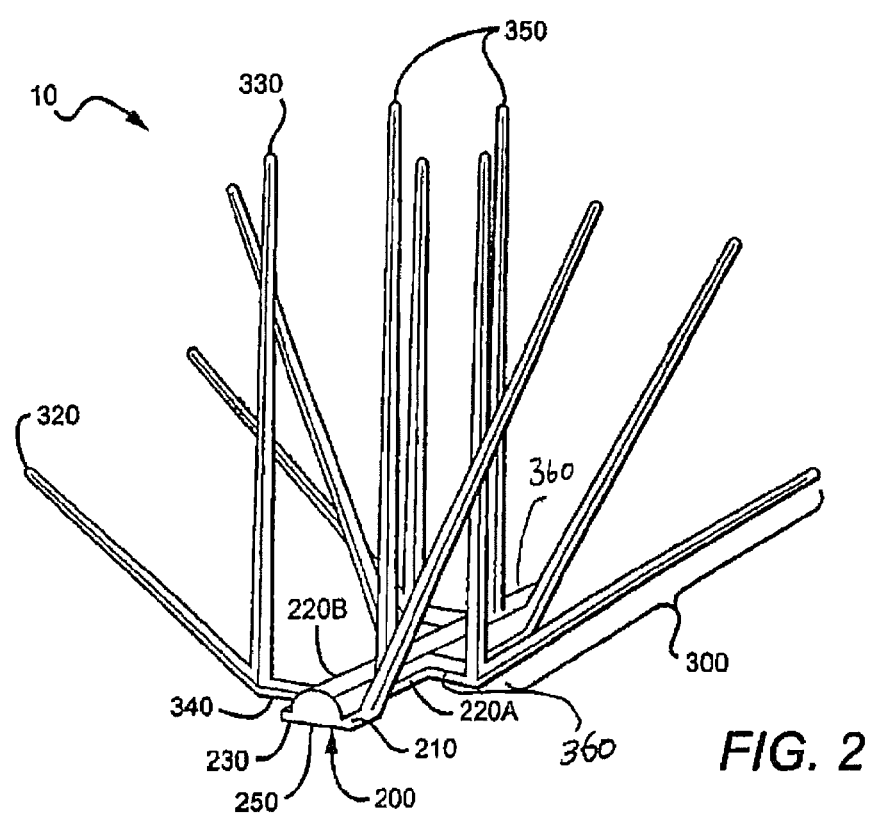
Figure 3:
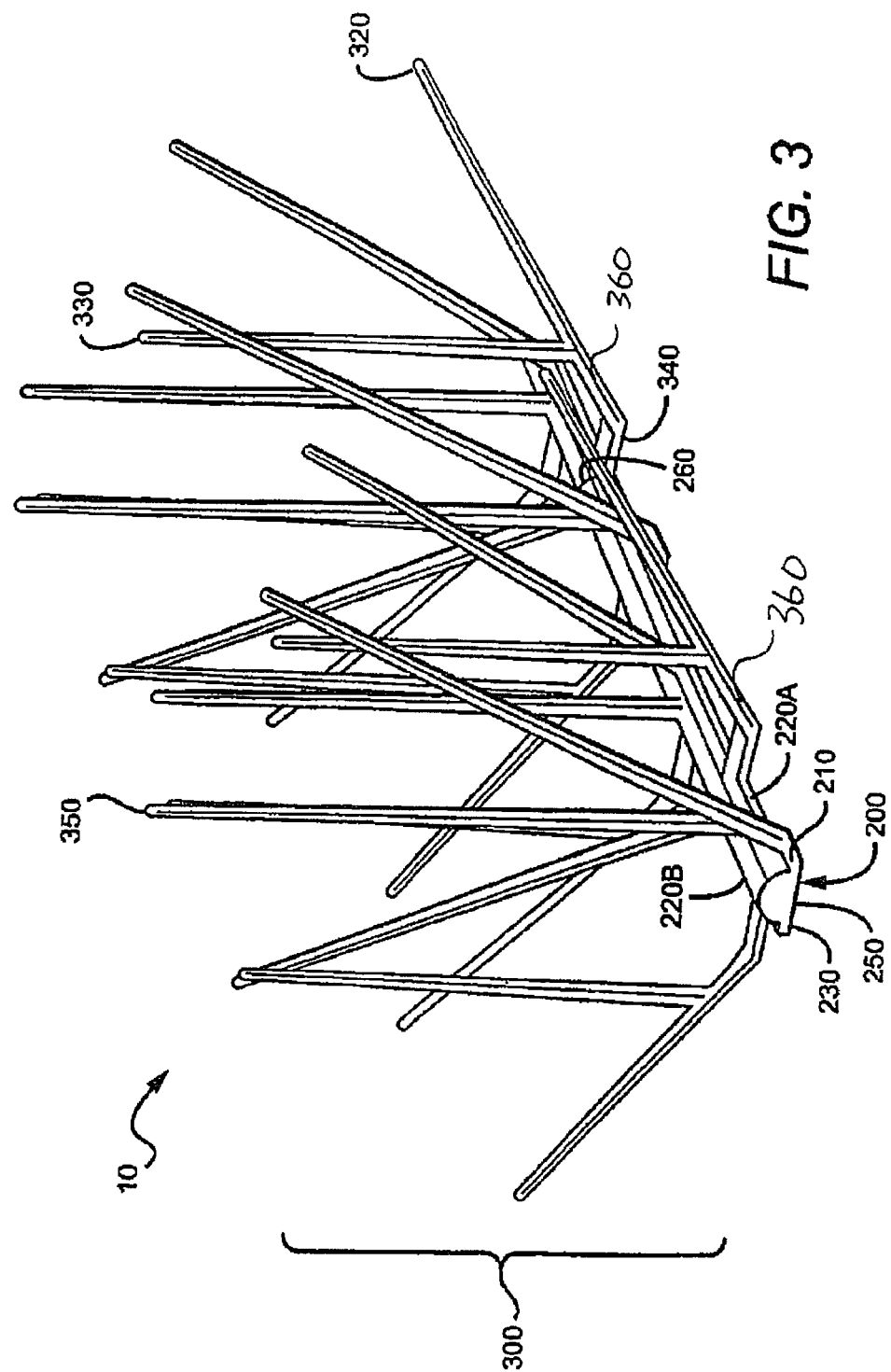
FIG. 3 is an arrangement of the bird deterrent shown in FIGS. 1 and 2.

In FIGS. 1, 2 and 3, a bird deterrent 10 generally has a base 200 and a plurality of branched spikes 300. Each branched spike 300 has two top ends 320, 330, and a bottom end 340. The base 200 has a top 210, two sides 220A, 220B, and a bottom 230.

As used herein, the term "branched spike" refers to a spike with at least three ends; in the figures two top ends 320, 330 and a bottom end 340, and the term "branch" refers to the intersection of at least two portions of the branched spike. Thus, bending a normal double-ended spike does not transform it into a "branched spike" as the term is employed herein.

Within this broad definition, there is tremendous room for variation. For example, although a typical branched spike 300 contains a single branch point leading to two top ends, contemplated spikes (not shown) could contain branch points that lead to three or even more four top ends. It is also contemplated that a single spike can have multiple branching points, i.e., a branch could itself be further branched, such as shown in FIG. 3. It is further contemplated that several branches may occur on one branched spike 300. For example, one branch may occur at least 3 cm from the bottom end of the branched spike, measured along the spike, and another branch may occur 8 cm from the bottom end of the same branched spike.

Each branch point of a spike represents a nexus among a proximal portion (referred to herein from time to time as a trunk) that extends to or towards the base, and at least two distal portions, (referred to herein from time to time as branches), that extend to or towards the ends of the spike. Viewed in this manner, a single branch angle (as shown by numeral 380 in FIG. 1) necessarily exists at each branch point between the two branches of simple cases, and multiple branch angles exist between the multiple pairs of branches in more complex cases in which more than two branches extend from a single branch point. Except in the special case of a 90° branch angle there is a definitional choice between an acute and an obtuse angle, and to simplify the discussion the branch angle acute angle is always defined herein to mean the acute angle.

In theory any branch angle between zero and 90° is possible. Nevertheless, in practice branch angles are typically at least 10 degrees, with more preferred angles falling between 10 degrees and 90 degrees, inclusive, and still more preferred branch angles falling between 45 degrees and 75 degrees, inclusive. This is because angles of less than 10° are likely to provide only minimal benefit relative to unbranched spikes, unless one or more of the branches are substantially bent distal to the branch point. By way of clarification, all ranges discussed herein are interpreted as inclusive.

It is also theoretically possible for the branches to have any orientation with respect to the base. Thus, branches could extend vertically up or down from a trunk, horizontally, or in any other orientation. At a single branch point, for example, one branch could extend upwards and another sideways, or one branch could extend sideways in one direction and other branch could extend sideways in the opposite, collinear, direction. In general, the trunk and branches should be substantially coplanar, with the branches preferably oriented vertically. Of course, where the spikes are formed from wire or some other materials, all sorts of different orientations can be implemented.

Suitable branched spikes can be fabricated from any suitable material, including for example, metal, plastic, wood, or any mixture thereof. To some extent molded plastic (and most preferably pressure injected polycarbonate) is the most preferred material for bird deterrents having branches spikes, because the branching introduces added complexity that would substantially increase the cost of deterrents using other materials. At least portions of both the trunks and branches of molded spikes can be fluted or ribbed to provide added strength (as shown by box 370 in FIG. 1). Cylindrical spikes are preferred, and ribbed spikes are considered to have a substantially cylindrical portion as long as the portion has at least three ribs. The ribs radiate from a core at that point in a substantially evenly spaced manner, and the ribs each extend away from the core by substantially the same extent.

The term "branches" is used herein to refer only to those distal portions that are more than de minimus. Thus, for example, the longitudinal ridges of a ridged spike are not considered to be branches because they are likely to extend only a few millimeters from the core section of the spike. From a rigid, mathematical perspective, the term "branches" is used herein to refer only to those distal portions that extend at least 1 cm from the vertex of a branch point. In practice, branches are considered to begin having substantial utility as bird deterrents where they extend at least 5 cm from their respective vertices. Longer branches are considered to be more advantageous, with preferred branches extending at 10 cm from their respective vertices.

It should be appreciated that the positioning of a branch point along a spike can significantly affect the usefulness of the branches. While not being limited to any particular theory or suggested mode of action, here or anywhere else in this disclosure, it is contemplated that branches very close to the top or bottom ends of a spike are thought to offer only minimal added deterrence against birds. Preferred branch points of a spike are therefore advantageously situated at least 5 cm from where the spike connects to the base. Those skilled in the art will also realize that useful positioning of a branch point should also be determined in conjunction with the branch angle and the lengths of the corresponding branches, with the goal of effectively deterring birds from perching on or near the base.

It should also be appreciated that the spikes can form numerous different configurations with respect to base. Fanned out configurations are considered to be especially useful because they tend to provide a large area of deterrence relative to the amount of spike material being used. Even more preferred are fan configurations in which the spikes are alternatingly long and short top. By way of example, the deterrent of FIGS. 1 and 2 include a fan shaped configuration having five branched spikes 300 of one length, into which are alternatingly disposed 350 non branched spikes of another length. Branched spikes can extend from the top, any of the sides of the base, or from an edge joining the top and a side of the base.

Referring now to the base 200 of the deterrent of FIGS. 1 and 2, the bottom 230 is preferably substantially flat as shown, to facilitate affixing of the device to a roof or other foundation. The deterrent is intended to be secured using screws or nails inserted trough holes 240, and alternatively or additionally with glue that can be applied to glue channel 250. The glue channel 250 may be any size and shape so long as it contains a reservoir for glue, while still allowing the base 200 to be mounted substantially flush with the surface to which the bird deterrent is to be attached. It is also contemplated that the base 200 may be coupled to a roof or other foundation using loops, holes, fasteners, latches, or any other couplers.

Experience has shown that installation of bird deterrents having molded plastic bases is facilitated by the inclusion of intentionally weakened areas, such as break points 260. This allows a user to conveniently snap the base at a desired point to readily size the base 200 to the needs of the specific job. Break points 260 are advantageously disposed at intervals of at least 4 inches, and more preferably intervals of 6 inches of more.

The base 200 may comprise plastic, wood, metal, or any combination thereof, and need not be fabricated from the same materials as the branched or unbranched spikes. To the extent that the spikes are being molded, it is generally cost effective to confluently mold the base.

From a method perspective, a novel bird deterrents can be fabricated by providing a base and fixing a branched spike to the base. As shown in the figures, the branched spike can have two branches, and can be utilized in conjunction with non-branched spikes. The step of fixing preferably comprises injection molding the branched spike and the base as a single piece, although it is contemplated that the base and spikes could be separately molded, or one of them could be molded and the other could be fabricated using a method other than molding.

Thus, specific embodiments and applications have been disclosed of bird deterrents having branched spikes. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A bird deterrent for attachment to a surface, comprising:
an elongated base from which extend a plurality of ribbed spikes, each of which has a trunk having ribs that extend continuously along substantially all of a length of the spikes and that radiates from a core of the spike, wherein the ribs are evenly spaced apart about the core, and where the base has a longitudinal channel extending along a lower surface of the base; and
wherein the base and the plurality of spikes comprise a continuous common plastic material.

2. The deterrent of claim 1, wherein at least some of the plurality of spikes are branched.

3. The deterrent of claim 2, wherein the plurality of spikes each extends from the base at an angle that is non-orthogonal to the base, and wherein the branched spikes have a branch that is orthogonal to a bottom of the base.

4. The deterrent of claim 2, wherein at least some of the plurality of spikes are both un-branched and non-orthogonal to a bottom of the base.

5. The deterrent of claim 1, wherein there are two spikes extending from a given longitudinal position along the base.

6. The deterrent of claim 1, wherein branched ones of the plurality of spikes alternate along a length of the base with non-branched ones of the plurality of spikes that are non-orthogonal with respect to the base.

7. The deterrent of claim 1, wherein the plastic material comprises polycarbonate.

8. The deterrent of claim 1, wherein at some position along the base one of the plurality of spikes has a different number of ends from another of the plurality of spikes.

9. The deterrent of claim 1, wherein the longitudinal channel terminates at an open longitudinal end of the base.

10. The deterrent of claim 9, wherein the base has a plurality of break points.

11. The deterrent of claim 1, wherein the base comprises a semi-circular vertical cross-section.

12. The deterrent of claim 1, wherein at least some of the spikes extend orthogonally from an upper surface of the base.

13. The deterrent of claim 1, wherein at least some of the spikes collectively form a fan-shaped configuration.

14. The deterrent of claim 13, wherein the fan-shaped configuration comprises five spikes extending from the base.

15. The deterrent of claim 1, wherein at least one of the spikes has at least three ends.

* * * * *